US011841751B2

(12) United States Patent
Gao

(10) Patent No.: US 11,841,751 B2
(45) Date of Patent: Dec. 12, 2023

(54) LOCKING STRUCTURE AND ELECTRONIC DEVICE

(71) Applicant: Fulian Precision Electronics (Tianjin) Co., LTD., Tianjin (CN)

(72) Inventor: Ying Gao, Shenzhen (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 704 days.

(21) Appl. No.: 16/941,811

(22) Filed: Jul. 29, 2020

(65) Prior Publication Data

US 2021/0384656 A1 Dec. 9, 2021

(30) Foreign Application Priority Data

Jun. 9, 2020 (CN) .......................... 202010519569.4

(51) Int. Cl.
*G06F 1/18* (2006.01)
(52) U.S. Cl.
CPC .............. *G06F 1/185* (2013.01); *G06F 1/186* (2013.01)
(58) Field of Classification Search
CPC ........ G06F 1/186; G06F 1/185; H05K 7/1405
See application file for complete search history.

(56) References Cited

U.S. PATENT DOCUMENTS 5,535,100 A * 7/1996 Lubahn ................... G06F 1/184
361/752

FOREIGN PATENT DOCUMENTS

CN 104564929 A 4/2015
TW 200613648 A 5/2006

* cited by examiner

*Primary Examiner* — James Wu
(74) *Attorney, Agent, or Firm* — ScienBiziP, P.C.

(57) ABSTRACT

Locking structure includes a first connector, a second connector, a locking member, a sliding member, and a holding member. The first connector includes a first cavity and a first protrusion in the first cavity. The second connector includes a second cavity and a second protrusion in the second cavity. The locking member is slidably received in the second cavity and extends into the first cavity. A peripheral wall of the locking member defines a fastening groove. The sliding member extends into the second cavity and abuts the locking member to drive the locking member to move toward the first protrusion and the second protrusion so that two opposite side walls of the fastening groove press against opposite sides of the first protrusion and the second protrusion. The sliding member defines a latching slot. The holding member includes a latching member for latching in or disengaging from the latching slot.

18 Claims, 4 Drawing Sheets

LOCKING STRUCTURE AND ELECTRONIC DEVICE

FIELD

The subject matter herein generally relates to locking structures, and more particularly to a locking structure for locking components of an electronic device.

BACKGROUND

Generally, locking components in electronic devices such as servers is difficult. For example, locking an expansion card in a server to a cabinet of the server usually has a complicated locking structure, inconvenient operation, and high cost.

BRIEF DESCRIPTION OF THE DRAWINGS

Implementations of the present disclosure will now be described, by way of embodiments, with reference to the attached figures.

DETAILED DESCRIPTION

Figure 1:
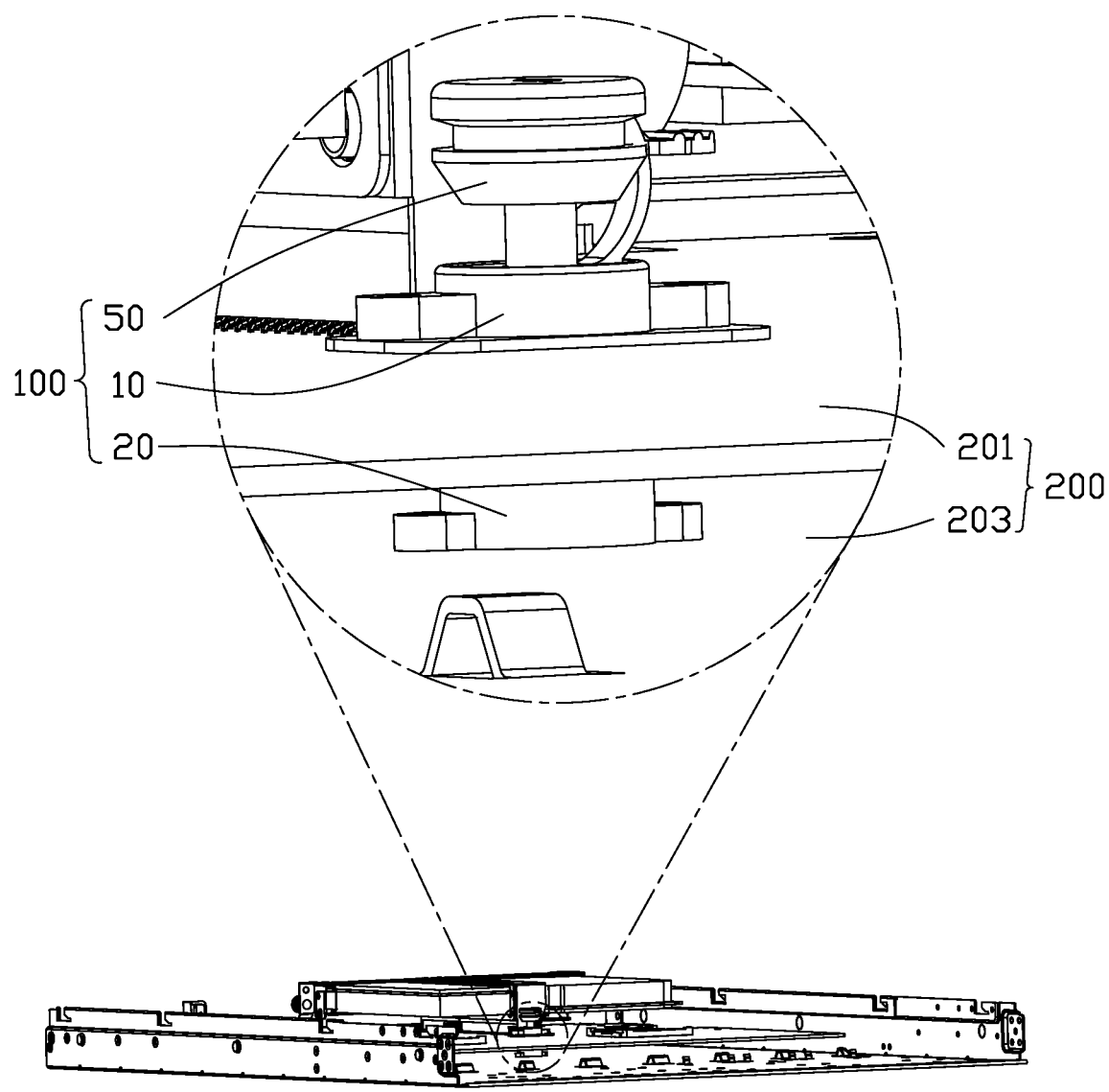
FIG. 1 is a schematic structural diagram of an electronic device according to an embodiment.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of an electronic device 200. The electronic device 200 includes a locking structure 100, an expansion card 201, and a housing 203. The locking structure 100 is used to lock and fix the expansion card 201 and the housing 203. The expansion card 201 includes a PCI (PERIPHERAL COMPONENT INTERCONNECT) slot structure, but is not limited thereto. It can be understood that in other embodiments, the locking structure 100 may also be applied to lock and fix two split structures on a workpiece such as a jig structure.

Figure 2:
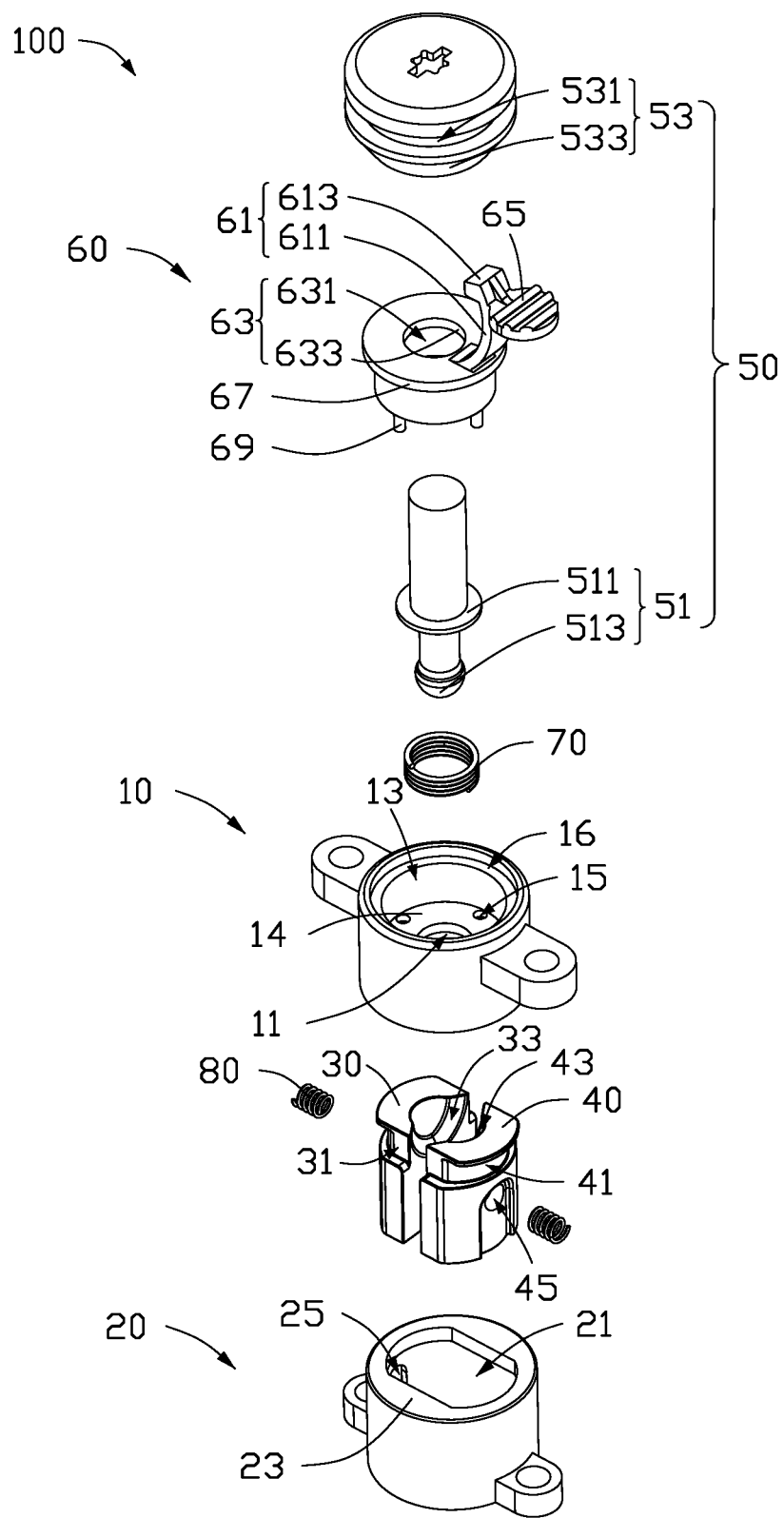
FIG. 2 is a schematic exploded view of a locking structure of the electronic device shown in FIG. 1.
Figure 3:
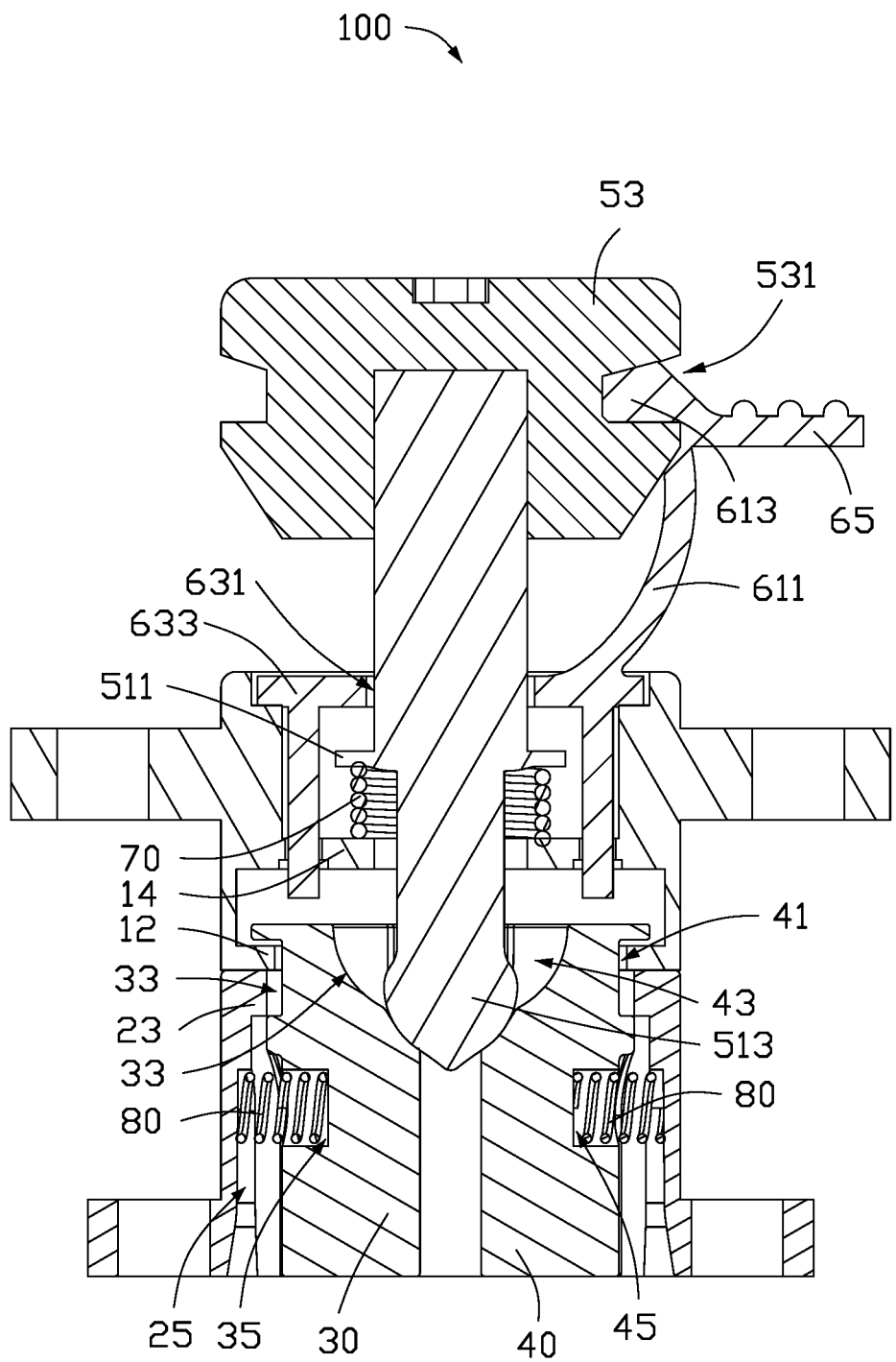
FIG. 3 is a cross-sectional view when the locking structure shown in FIG. 2 is in a locked state.

Referring to FIG. 2 and FIG. 3, the locking structure 100 includes a first connector 10, a second connector 20, a first locking member 30, a second locking member 40, a sliding member 50, and a holding member 60. The first connector 10 defines a first cavity 11, and a first protrusion 12 is located in the first cavity 11. The first protrusion 12 is formed on a wall of the first cavity 11. The first connector 10 is used to connect to the expansion card 201. The second connector 20 defines a second cavity 21, and a second protrusion 23 is located in the second cavity 21. The second protrusion 23 is formed on a wall of the second cavity 21. The second connector 20 is used to connect to the housing 203. The second cavity 21 communicates with the first cavity 11. The first locking member 30 and the second locking member 40 are slidably disposed in the second cavity 21 and can extend into the first cavity 11. A peripheral wall of the first locking member 30 defines a first fastening groove 31, and a peripheral wall of the second locking member 40 defines a second fastening groove 41. When the first locking member 30 and the second locking member 40 move away from each other, two opposite side walls of the first fastening groove 31 respectively press against opposite sides of the first protrusion 12 and the second protrusion 23, and two opposite side walls of the second fastening groove 41 respectively press against opposite sides of the first protrusion 12 and the second protrusion 23, so that the first connector 10 and the second connector 20 are relatively fixed, and the expansion card 201 and the housing 203 are locked and fixed by the locking structure 100.

The sliding member 50 is slidably received in the first cavity 11. One end of the sliding member 50 can extend into the second cavity 21 and resist against the first locking member 30 and the second locking member 40. When the sliding member 50 slides along the first cavity 11 toward the second cavity 21, one end of the sliding member 50 drives the first locking member 30 and the second locking member 40 to move away from each other, so that the first fastening groove 31 and the second fastening groove 41 move toward the adjacent first protrusion 12 and the second protrusion 23, so that the first protrusion 12 and the second protrusion 23 enter the corresponding first fastening groove 31 or the second fastening groove 41. In one embodiment, the first protrusion 12 and the second protrusion 23 abut each other, but in other embodiments, other parts of the first connector 10 and the second connector 20 abut each other, and when the first fastening groove 31 and the second fastening groove 41 press against the opposite sides of the first protrusion 12 and the second protrusion 23, the first connector 10 and the second connector 20 are relatively fixed.

Figure 4:
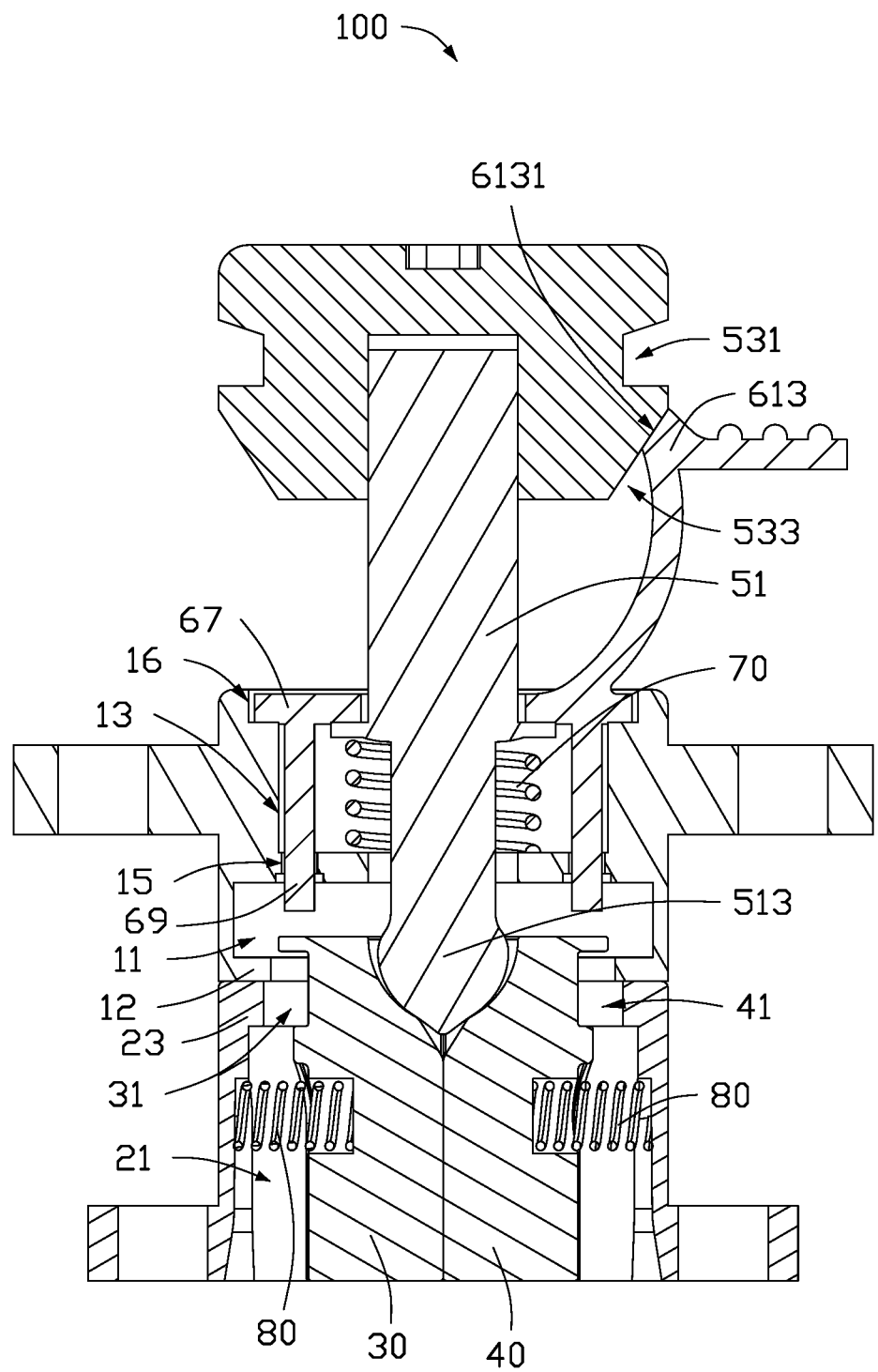
FIG. 4 is a cross-sectional view when the locking structure shown in FIG. 2 is in an unlocked state.

The sliding member 50 includes a sliding shaft portion 51 and a first pressing portion 53. The sliding shaft portion 51 slidably penetrates the first cavity 11 and the second cavity 21. The first pressing portion 53 is located on a side of the sliding shaft portion 51 facing away from the first cavity 11. A latching slot 531 is defined on a peripheral wall of the first pressing portion 53. The holding member 60 is located on the first connector 10. The holding member 60 is provided with a latching member 61. The latching member 61 can be snapped into or out of the latching slot 531. When the groove wall of the first fastening groove 31 or the second fastening groove 41 abuts on both sides of the first protrusion 12 and the second protrusion 23, the sliding member 50 slides along the first cavity 11 and the second cavity 21 until the latching slot 531 is opposite the latching member 61, and the latching member 61 snaps into the latching slot 531 to prevent the sliding member 50 from moving, and the first connector 10 and the second connector 20 are locked and fixed. When the latching member 61 is disengaged from the latching slot 531, the sliding member 50 can move along the second cavity 21 toward the first cavity 11, and the first locking member 30 and the second locking member 40 move toward each other, so that the first fastening groove 31 and the second fastening groove 41 move away from the first protrusion 12 and the second protrusion 23, thereby causing the first connector 10 and the second connector 20 to unlock, as shown in FIG. 4.

In one embodiment, structures of the first locking member 30 and the second locking member 40 are substantially the same and symmetrically disposed in the second cavity 21 to make a locking force of the locking structure 100 on the expansion card 201 and the housing 203 to be uniform. It can be understood that in other embodiments, the first locking member 30 or the second locking member 40 may also be omitted, so that only two opposing groove walls of the first fastening groove 31 or the second fastening groove 41 press against the two sides of the first protrusion 12 and the second protrusion 23, thereby fixing the first connector 10 and the second connector 20 and locking the expansion card 201 and the housing 203 of the electronic device 200.

An end portion of the sliding shaft portion 51 facing away from the first pressing portion 53 is provided with a resisting portion 513. The first locking member 30 and the second locking member 40 define a groove 33 and a groove 43, respectively facing each other. The groove 33 and the groove 43 are located on a side of the first locking member 30 and the second locking member 40 facing the sliding shaft portion 51. The resisting portion 513 can extend into the groove 33 and the groove 43 and abut the groove walls of the groove 33 and the groove 43. A peripheral wall of the resisting portion 513 has an arc structure, but it is not limited thereto. For example, in other embodiments, a structure of the resisting portion 513 may be a tapered structure. The shapes of the groove 33 and the groove 43 are conformed to the shape of the resisting portion 513, so that the resisting portion 513 evenly contacts the groove walls of the groove 33 and the groove 43.

In one embodiment, the outer diameter of the first pressing portion 53 is greater than the outer diameter of the sliding shaft portion 51, which improves the convenience for pressing the sliding member 50. It can be understood that, in other embodiments, the sliding shaft portion 51 and the first pressing portion 53 may also be an integrated structure. As long as the latching slot 531 is disposed on the peripheral wall of the sliding member 50 outside the first cavity 11, the latching member 61 on the holding member 60 can be snapped into the latching slot 531.

It can be understood that in other embodiments, the first connector 10 may be connected to the housing 203, and the second connector 20 may be connected to the expansion card 201, as long as the first locking member 30 and the second locking member 40 move away from each other so that the first fastening groove 31 and the second fastening groove 41 are held on the two opposite sides of the first protrusion 12 and the second protrusion 23, and the expansion card 201 and the housing 203 are relatively fixed.

The locking structure 100 further includes a first resilient member 70. The first connector 10 defines a third cavity 13 communicating with the first cavity 11. The first resilient member 70 is received in the third cavity 13 and sleeved outside the sliding shaft portion 51. A first stopping portion 511 is provided on a peripheral wall of the sliding shaft portion 51. The first connector 10 is provided with a second stopping portion 14 on a groove wall of the third cavity 13. Both ends of the first resilient member 70 abut against the first stopping portion 511 and the second stopping portion 14, respectively, so as to drive the sliding shaft portion 51 to move away from the first locking member 30 and the second locking member 40. The first stopping portion 511 is stopped by the holding member 60. When the latching member 61 disengages from the latching slot 531 on the first pressing portion 53, the first resilient member 70 drives the sliding member 50 to move along the second cavity 21 toward the first cavity 11 until the first stopping portion 511 is stopped by the holding member 60.

The holding member 60 further includes a main body 63. The latching member 61 is located on the main body 63. The main body 63 is received in the third cavity 13. The main body 63 defines a through hole 631 communicating with the first cavity 11, and a third stopping portion 633 is formed on a peripheral side of the through hole 631. A side of the first stopping portion 511 on the sliding shaft portion 51 facing away from the first locking member 30 and the second locking member 40 can pass through the through hole 631, so that the sliding shaft portion 51 enters the first cavity 11. The third stopping portion 633 is located on a side of the first stopping portion 511 facing away from the second stopping portion 14 and can stop the movement of the first stopping portion 511.

The latching member 61 includes a deforming portion 611 and a latching portion 613. The deforming portion 611 is located on the main body 63 and extends toward a side of the sliding member 50 facing away from the first connector 10. The latching portion 613 is located at one end of the deforming portion 611. The deformation of the deforming portion 611 can drive the latching portion 613 into or out of the latching slot 531. The holding member 60 further includes a second pressing portion 65. The second pressing portion 65 is located on a side of the latching portion 613 facing away from the latching slot 531, so that a user can press the holding member 60 to deform the deforming portion 611. It can be understood that in other embodiments, the second pressing portion 65 may also be omitted.

The locking structure 100 further includes two second resilient members 80 received in the second cavity 21. A first receiving groove 35 is defined in a peripheral wall of the first locking member 30. A second receiving groove 45 is defined in a peripheral wall of the second locking member 40. The first receiving groove 35 and the second receiving groove 45 are respectively located on opposite sides of the first locking member 30 and the second locking member 40. The second connector 20 defines two accommodating grooves 25 opposite to the first receiving groove 35 and the second receiving groove 45 on a cavity wall of the second cavity 21, respectively. Two ends of the second resilient member 80 are respectively received in the corresponding accommodating groove 25 and the first receiving groove 35 or the second receiving groove 45. When the latching member 61 is disengaged from the latching slot 531, the two second resilient members 80 drive the first locking member 30 and the second locking member 40 to move toward each other, thereby causing the first fastening groove 31 and the second fastening groove 41 to disengage from the first protrusion 12 and the second protrusion 23, and the first connector 10 and the second connector 20 are unlocked, so that the expansion card 201 and the housing 203 of the electronic device 200 can be detached.

A connecting portion 67 is provided on one side of the main body 63. A receiving cavity 16 is defined in a side of the first connector 10 facing away from the second connector 20. The connecting portion 67 is received in the receiving cavity 16 and contacts a groove wall of the receiving cavity 16. In one embodiment, the connecting portion 67 and the groove wall of the receiving groove 16 are fused together, but it is not limited thereto. For example, in other embodiments, the connecting portion 67 and the groove wall of the receiving cavity 16 may be fixed by screws or glue.

The holding member 60 further includes a plurality of positioning portions 69 provided on the main body 63. The second stopping portion 14 defines a plurality of positioning holes 15. The positioning portions 69 can be inserted into the positioning holes 15 so that the holding member 60 is connected to the first connector 10 in a rotation-proof manner. It can be understood that in other embodiments, the positioning portions 69 and the positioning holes 15 may be omitted.

Referring to FIG. 4, the first pressing portion 53 of the sliding member 50 is provided with a first guiding surface 533. The latching member 61 is provided with a second guiding surface 6131. The first guiding surface 533 is opposite to the second guiding surface 6131. When the latching member 61 slides away from the latching slot 531 and the sliding member 50, the first guiding surface 533 abuts and slides relative to the second guiding surface 6131. When the sliding member 50 slides, the deforming portion 611 deforms to adapt the second guiding surface 6131 to slide along the first guiding surface 533 until the latching slot 531 is opposite to the latching portion 613, and the latching portion 613 is locked into the latching slot 531. It can be understood that in other embodiments, the first guiding surface 533 and the second guiding surface 6131 may also be omitted. Pressing the second pressing portion 65 deforms the deforming portion 611, and the holding member 60 is away from the sliding member 50, thereby preventing the holding member 60 from interfering with the sliding member 50.

To lock the expansion card 201 and the housing 203, the first connector 10 is connected to the expansion card 201 and the second connector 20 is connected to the housing 203. The first pressing portion 53 is pressed to move the sliding member 50 along the first cavity 11 toward the second cavity 21, and the resisting portion 513 abuts against the groove walls of the groove 33 and the groove 43 and drives the first locking member 30 and the second locking member 40 to move away from each other, so that the opposite groove walls of the first fastening groove 31 and the second fastening groove 41 respectively resist the opposite sides of the first protrusion 12 and the second protrusion 23. The sliding member 50 slides until the latching slot 531 is opposite to the latching portion 613, and the latching portion 613 snaps into the latching slot 531, so that the first connector 10 and the second connector 20 are locked and fixed.

To unlock the expansion card 201 and the housing 203, the first pressing portion 53 is released, and the second pressing portion 65 is pressed to disengage the latching portion 613 from the latching slot 531. The first resilient member 70 drives the sliding member 50 to move along the second cavity 21 toward the first cavity 11. The two second resilient members 80 drive the first locking member 30 and the second locking member 40 to move toward each other to disengage the first fastening groove 31 and the second fastening groove 41 from the first protrusion 12 and the second protrusion 23. Then, the first connector 10 and the second connector 20 are unlocked and the expansion card 201 and the housing 203 are detached.

The locking structure 100 includes a first part and a second part. The first part includes the first connector 10, and the sliding member 50 and the holding member 60 are provided on the first connector 10. The second part includes the second connector 20, and the first locking member 30 and the second locking member 40 are provided on the second connector 20. The first part and the second part are independent structures, which can be installed separately on any two components to be locked together, which makes the locking structure 100 have a simple structure and strong versatility.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A locking structure comprising:
a first connector defining a first cavity and comprising a first protrusion in the first cavity;
a second connector defining a second cavity and comprising a second protrusion in the second cavity;
at least one locking member slidably received in the second cavity and extending into the first cavity, a peripheral wall of the at least one locking member defining at least one fastening groove, two opposite side walls of the at least one fastening groove configured to respectively press against opposite sides of the first protrusion and the second protrusion;
a sliding member slidably received in the first cavity and one end of the sliding member extending into the second cavity and configured to abut the at least one locking member to drive the at least one locking member to move toward the first protrusion and the second protrusion, the sliding member defining a latching slot; and
a holding member located on the first connector and comprising a latching member configured to latch in the latching slot or disengage from the latching slot.

2. The locking structure of claim 1, further comprising a first resilient member; wherein:
the first connector defines a third cavity communicating with the first cavity;
the first resilient member is received in the third cavity and sleeved on the sliding member;
the sliding member comprises a first stopping portion on a peripheral wall of the sliding member;
a wall of the third cavity comprises a second stopping portion; and
two ends of the first resilient member resist against the first stopping portion and the second stopping portion, respectively and drive the sliding member to move away from the at least one locking member.

3. The locking structure of claim 2, wherein:
the holding member comprises a main body received in the third cavity;
the main body defines a through hole;
a third stopping portion is formed on a peripheral side of the through hole;
the sliding member is configured to enter the first cavity through the through hole;

the third stopping portion is located on a side of the first stopping portion facing away from the second stopping portion and configured to stop the first stopping portion from moving.

4. The locking structure of claim 1, wherein:
the end of the sliding member extending into the second cavity comprises a resisting portion;
a side of the at least one locking member facing the sliding member defines a groove;
the resisting portion is configured to enter the groove and resist against a wall of the groove; and
a shape of the groove conforms to a shape of the resisting portion.

5. The locking structure of claim 1, wherein:
the at least one locking member comprises two locking members slidably received in the second cavity;
the sliding member is configured to insert between the two locking members and drive the two locking members to move away from each other; and
an inner wall of the fastening groove of each of the two locking members presses against opposite sides of the first protrusion and the second protrusion.

6. The locking structure of claim 1, further comprising at least one second resilient member located in the second cavity; wherein:
a receiving groove is defined in a peripheral wall of the at least one locking member;
an accommodating groove is defined in a wall of the second cavity opposite the receiving groove;
two ends of the at least one second resilient member are respectively received in the accommodating groove and the receiving groove for driving the at least one locking member to move, thereby causing the at least one fastening groove to disengage from the first protrusion and the second protrusion.

7. The locking structure of claim 1, wherein:
the holding member comprises a main body located on the first connector;
the latching member comprises a deforming portion and a latching portion;
the deforming portion is located on the main body and extends toward a side of the sliding member facing away from the first connector;
the latching portion is located at one end of the deforming portion;
deformation of the deforming portion drives the latching portion into or out of the latching slot.

8. The locking structure of claim 7, wherein:
the sliding member is provided with a first guiding surface;
the latching portion is provided with a second guiding surface; and
when the latching member disengages from the latching slot and the sliding member slides, the first guiding surface abuts and slides relative to the second guiding surface.

9. The locking structure of claim 7, wherein:
the holding member further comprises a second pressing portion; and
the second pressing portion is located on a side of the latching portion facing away from the latching slot.

10. An electronic device comprising:
an expansion card;
a housing; and
a locking structure configured to lock the expansion card on the housing;
wherein the locking structure comprises:

a first connector defining a first cavity and comprising a first protrusion in the first cavity;
a second connector defining a second cavity and comprising a second protrusion in the second cavity;
at least one locking member slidably received in the second cavity and extending into the first cavity, a peripheral wall of the at least one locking member defining at least one fastening groove, two opposite side walls of the at least one fastening groove configured to respectively press against opposite sides of the first protrusion and the second protrusion;
a sliding member slidably received in the first cavity and one end of the sliding member extending into the second cavity and configured to abut the at least one locking member to drive the at least one locking member to move toward the first protrusion and the second protrusion, the sliding member defining a latching slot; and
a holding member located on the first connector and comprising a latching member configured to latch in the latching slot or disengage from the latching slot.

11. The electronic device of claim 10, wherein:
the locking structure further comprises a first resilient member;
the first connector defines a third cavity communicating with the first cavity;
the first resilient member is received in the third cavity and sleeved on the sliding member;
the sliding member comprises a first stopping portion on a peripheral wall of the sliding member;
a wall of the third cavity comprises a second stopping portion; and
two ends of the first resilient member resist against the first stopping portion and the second stopping portion, respectively and drive the sliding member to move away from the at least one locking member.

12. The electronic device of claim 11, wherein:
the holding member comprises a main body received in the third cavity;
the main body defines a through hole;
a third stopping portion is formed on a peripheral side of the through hole;
the sliding member is configured to enter the first cavity through the through hole;
the third stopping portion is located on a side of the first stopping portion facing away from the second stopping portion and configured to stop the first stopping portion from moving.

13. The electronic device of claim 10, wherein:
the end of the sliding member extending into the second cavity comprises a resisting portion;
a side of the at least one locking member facing the sliding member defines a groove;
the resisting portion is configured to enter the groove and resist against a wall of the groove; and
a shape of the groove conforms to a shape of the resisting portion.

14. The electronic device of claim 10, wherein:
the at least one locking member comprises two locking members slidably received in the second cavity;
the sliding member is configured to insert between the two locking members and drive the two locking members to move away from each other; and
an inner wall of the fastening groove of each of the two locking members presses against opposite sides of the first protrusion and the second protrusion.

15. The electronic device of claim 10, wherein:

the locking structure further comprises at least one second resilient member located in the second cavity;

a receiving groove is defined in a peripheral wall of the at least one locking member;

an accommodating groove is defined in a wall of the second cavity opposite the receiving groove;

two ends of the at least one second resilient member are respectively received in the accommodating groove and the receiving groove for driving the at least one locking member to move, thereby causing the fastening groove to disengage from the first protrusion and the second protrusion.

16. The electronic device of claim 10, wherein:

the holding member comprises a main body located on the first connector;

the latching member comprises a deforming portion and a latching portion;

the deforming portion is located on the main body and extends toward a side of the sliding member facing away from the first connector;

the latching portion is located at one end of the deforming portion;

deformation of the deforming portion drives the latching portion into or out of the latching slot.

17. The electronic device of claim 16, wherein:

the sliding member is provided with a first guiding surface;

the latching portion is provided with a second guiding surface; and when the latching member disengages from the latching slot and the sliding member slides, the first guiding surface abuts and slides relative to the second guiding surface.

18. The electronic device of claim 16, wherein:

the holding member further comprises a second pressing portion; and the second pressing portion is located on a side of the latching portion facing away from the latching slot.

* * * * *